(12) United States Patent  (10) Patent No.: US 8,522,833 B2
Chou  (45) Date of Patent: Sep. 3, 2013

(54) DEVICE FOR SEALING AND INFLATING INFLATABLE OBJECT

(76) Inventor: Wen San Chou, Tainan Hsien (TW)

( * ) Notice: Subject to any disclaimer, the term of this patent is extended or adjusted under 35 U.S.C. 154(b) by 878 days.

(21) Appl. No.: 12/658,324

(22) Filed: Feb. 9, 2010

(65) Prior Publication Data

US 2010/0147416 A1  Jun. 17, 2010

Related U.S. Application Data

(63) Continuation-in-part of application No. 12/290,796, filed on Nov. 4, 2008, now Pat. No. 8,297,944.

(51) Int. Cl.
B65B 31/00 (2006.01)

(52) U.S. Cl.
USPC .............................. 141/38; 152/415

(58) Field of Classification Search
USPC ........................... 141/38; 152/415
See application file for complete search history.

(56) References Cited

U.S. PATENT DOCUMENTS

| | | | |
|---|---|---|---|
| 4,765,367 A * | 8/1988 | Scott | 141/38 |
| 5,070,917 A * | 12/1991 | Ferris et al. | 141/38 |
| 5,386,857 A * | 2/1995 | Fogal et al. | 141/38 |
| 5,403,417 A * | 4/1995 | Dudley et al. | 141/38 |
| 6,176,285 B1 | 1/2001 | Gerresheim et al. | |
| 6,283,172 B1 * | 9/2001 | Thurner | 141/38 |
| 6,345,650 B1 * | 2/2002 | Paasch et al. | 141/5 |
| 6,412,524 B1 * | 7/2002 | Fogal, Sr. | 141/38 |
| 6,454,892 B1 | 9/2002 | Gerresheim et al. | |
| 6,736,170 B2 * | 5/2004 | Eriksen et al. | 141/38 |
| 6,766,834 B1 * | 7/2004 | Eckhardt | 141/38 |
| 6,789,581 B2 * | 9/2004 | Cowan et al. | 141/38 |
| 6,889,723 B2 | 5/2005 | Gerresheim et al. | |
| 6,964,284 B2 * | 11/2005 | Eckhardt | 141/38 |
| 6,968,869 B2 * | 11/2005 | Eckhardt | 141/38 |
| 7,021,348 B2 | 4/2006 | Eriksen et al. | |
| 7,028,720 B2 * | 4/2006 | Eckhardt | 141/38 |
| 7,178,564 B2 | 2/2007 | Kojima et al. | |
| 7,240,642 B2 * | 7/2007 | Chou | 123/41.35 |
| 7,389,800 B2 * | 6/2008 | Hickman et al. | 141/38 |
| 7,694,698 B2 * | 4/2010 | Marini | 141/38 |
| 7,748,295 B2 * | 7/2010 | Hong | 141/38 |
| 7,789,110 B2 * | 9/2010 | Marini | 141/38 |
| 7,798,183 B2 * | 9/2010 | Cegelski et al. | 141/38 |
| 7,854,242 B2 * | 12/2010 | Stehle | 141/38 |
| 7,878,360 B2 * | 2/2011 | Takeda | 220/203.13 |
| 7,891,385 B2 * | 2/2011 | Yanagi et al. | 141/38 |
| 8,016,002 B2 * | 9/2011 | Yoshida et al. | 141/38 |
| 8,020,588 B2 * | 9/2011 | Wang | 141/38 |
| 8,146,622 B2 * | 4/2012 | Guan et al. | 141/38 |
| 8,181,676 B2 * | 5/2012 | Steele et al. | 141/38 |
| 8,201,586 B2 * | 6/2012 | Yoshida et al. | 141/38 |
| 8,251,105 B2 * | 8/2012 | Lolli et al. | 141/38 |

(Continued)

Primary Examiner — Gregory Huson
Assistant Examiner — Nicolas A Arnett
(74) Attorney, Agent, or Firm — Charles E. Baxley

(57) ABSTRACT

A sealing and inflating assembly includes a piston slidably engaged in a cylinder housing and coupled to a motor with a piston rod for forming an air compressor, an outlet tube extended from the cylinder housing and having an outlet port, and a tire repairing container for receiving a sealing preparation and having an upper coupler for detachably attaching to the outlet port of the outlet tube and having a lower opening coupled to a nozzle for easily and quickly coupling the outlet tube of the air compressor to an inflatable object and for quickly repairing the inflatable object, and for quickly inflating the inflatable object by disengaging the tire repairing container from the outlet tube of the air compressor.

9 Claims, 11 Drawing Sheets

(56) References Cited

U.S. PATENT DOCUMENTS

| | | | |
|---|---|---|---|
| 8,276,624 B2* | 10/2012 | Steele et al. | 141/38 |
| 8,297,321 B2* | 10/2012 | Chou | 141/38 |
| 8,302,636 B2* | 11/2012 | Sekiguchi | 141/38 |
| 8,336,581 B2* | 12/2012 | Lolli et al. | 141/38 |
| 8,342,215 B2* | 1/2013 | Sekiguchi | 141/38 |
| 2003/0056851 A1* | 3/2003 | Eriksen et al. | 141/38 |
| 2004/0159365 A1* | 8/2004 | Cowan et al. | 141/38 |
| 2004/0216806 A1* | 11/2004 | Eckhardt | 141/38 |
| 2005/0191193 A1* | 9/2005 | Chou | 417/437 |
| 2006/0272731 A1* | 12/2006 | Takeda | 141/38 |
| 2007/0077157 A1* | 4/2007 | Chou | 417/437 |
| 2007/0181209 A1* | 8/2007 | Stehle | 141/38 |
| 2008/0029181 A1* | 2/2008 | Marini | 141/38 |
| 2008/0060734 A1* | 3/2008 | Stehle | 141/38 |
| 2008/0145245 A1* | 6/2008 | Chou | 417/415 |
| 2008/0230142 A1* | 9/2008 | Hickman | 141/38 |
| 2009/0050232 A1* | 2/2009 | Guan et al. | 141/38 |
| 2009/0107578 A1* | 4/2009 | Trachtenberg et al. | 141/38 |
| 2009/0266440 A1* | 10/2009 | Lolli et al. | 141/38 |
| 2009/0301602 A1* | 12/2009 | Lolli et al. | 141/38 |
| 2010/0071801 A1* | 3/2010 | Sekiguchi | 141/38 |
| 2010/0071822 A1* | 3/2010 | Sekiguchi | 152/504 |
| 2010/0108186 A1* | 5/2010 | Yoshida et al. | 141/38 |
| 2010/0147416 A1* | 6/2010 | Chou | 141/38 |
| 2010/0224281 A1* | 9/2010 | Yoshida et al. | 141/38 |
| 2011/0073214 A1* | 3/2011 | Guan et al. | 141/38 |
| 2011/0155279 A1* | 6/2011 | Marini | 141/38 |
| 2011/0180180 A1* | 7/2011 | Lolli et al. | 141/38 |
| 2011/0192492 A1* | 8/2011 | Kanenari et al. | 141/38 |
| 2012/0000572 A1* | 1/2012 | Chou | 141/38 |
| 2012/0000573 A1* | 1/2012 | Chou | 141/38 |
| 2012/0037267 A1* | 2/2012 | Senno et al. | 141/38 |
| 2012/0231100 A1* | 9/2012 | Chou | 425/12 |
| 2012/0298255 A1* | 11/2012 | Nakao | 141/38 |
| 2013/0000777 A1* | 1/2013 | Kojima et al. | 141/38 |

* cited by examiner

DEVICE FOR SEALING AND INFLATING INFLATABLE OBJECT

The present invention is a continuation-in-part of U.S. patent application Ser. No. 12/290,796, filed 4 Nov. 2008, now U.S. Pat. No. 8,297,944.

BACKGROUND OF THE INVENTION

1. Field of the Invention

The present invention relates to an air compressor or a sealing and inflating assembly for sealing and inflating an inflatable object, and more particularly to an air compressing device including a quick coupling device for quickly coupling and attaching and securing various parts or elements or attachments or facilities or tire repairing containers to an outlet tube of the air compressor and also for quickly disengaging the parts or elements or attachments or facilities from the air compressor and thus for allowing the parts or elements or attachments or facilities or tire repairing containers to be quickly and changeably attached and secured to the outlet tube of the air compressor.

2. Description of the Prior Art

Various kinds of typical air compressing devices have been developed by the applicant and comprise a cylinder housing, a piston slidably received in the cylinder housing, and a motor coupled or attached to the cylinder housing and coupled to the piston for moving the piston relative to the cylinder housing in a reciprocating action, in order to generate a pressurized air of a greater air pressure and a decreased flowing quantity, and a pressure tight container for receiving a sealing preparation and for selectively supplying the sealing preparation to seal and inflate the inflatable objects, such as vehicle tires, air beds, air cushions, hovercrafts, etc.

For example, U.S. Pat. No. 6,176,285 to Gerresheim et al. discloses one of the typical preparations for the sealing of tires with punctures, and repairing apparatuses for the sealing and pumping up of tires and tires with an integrated sealing preparation comprising a pressure tight container that is coupled to a pressurized air cartridge.

However, the pressure tight container and the pressurized air cartridge are coupled together with a shut off valve, a gas outlet, a gas inlet and may not be easily disengaged from each other, and an outlet valve and an additional riser tube are further required to be attached to the upper portion of the pressure tight container for allowing the sealing preparation to be selectively supplied to seal and inflate the inflatable objects, but may not be easily connected or coupled to the air compressor devices.

U.S. Pat. No. 6,454,892 to Gerresheim et al. and U.S. Pat. No. 6,889,723 to Gerresheim et al. disclose two of the typical preparations for sealing punctured tires and apparatuses for the sealing and pumping up of tires, and each comprising a pressure tight container coupled to an air compressor, and a shut off valve and a gas inlet are coupled to the air compressor and the pressure tight container for supplying the pressurized air to force the sealing preparation to seal the inflatable objects.

However, the pressure tight container may not be easily removed from the air compressor, and the air compressor also may not be easily and quickly and directly coupled to the inflatable objects and to readily inflate the inflatable objects, such as tires, air beds, air cushions, hovercrafts, etc., in addition, the puncture sealant is required to flow through the shut off valve and the outlet valve.

U.S. Pat. No. 7,021,348 to Eriksen et al. discloses a further typical device for sealing and inflating an inflatable object and comprising a tubular container coupled to an air compressor, and a complicated coupling structure is further required for coupling the tubular container to the air compressor.

However, similarly, the tubular container may not be easily and quickly removed from the air compressor, and the air compressor may not be easily and quickly and directly coupled to the inflatable objects and to inflate the inflatable objects, in addition, the puncture sealant is required to flow through the complicated coupling structure.

U.S. Pat. No. 7,178,564 to Kojima et al. discloses a still further typical supplying/removing device of puncture sealant of tire and comprising a pressure resistant bottle coupled to an air compressor or a high pressure source, and a complicated coupling apparatus body is further required for coupling the pressure resistant bottle to the air compressor.

However, similarly, the pressure resistant bottle may not be easily removed from the air compressor, and the air compressor may not be easily and quickly and directly coupled to the inflatable objects and to inflate the inflatable objects, in addition, the puncture sealant is required to flow through the complicated coupling apparatus body.

The present invention has arisen to mitigate and/or obviate the afore-described disadvantages of the conventional air compressor devices and/or sealing and inflating devices for sealing and inflating the inflatable objects.

SUMMARY OF THE INVENTION

The primary objective of the present invention is to provide a sealing and inflating assembly comprising an air compressing device including a quick coupling device for quickly coupling and attaching and securing various parts or elements or attachments or facilities to an outlet tube of the air compressor and also for quickly disengaging the parts or elements or attachments or facilities from the air compressor and thus for allowing the parts or elements or attachments or facilities to be quickly and changeably attached and secured to the outlet tube of the air compressor.

The other objective of the present invention is to provide a sealing and inflating assembly for sealing and inflating an inflatable object comprising a tire repairing container that may be easily and quickly and changeably attached and secured to the outlet tube of the air compressor.

In accordance with one aspect of the invention, there is provided a sealing and inflating assembly comprising a cylinder housing, a piston slidably engaged in the cylinder housing, a piston rod extended from the piston, a motor attached to the cylinder housing and coupled to the piston rod for moving the piston relative to the cylinder housing in a reciprocating action, in order to generate a pressurized air, the cylinder housing including an outlet tube extended outwardly therefrom and communicating with the cylinder housing for receiving the pressurized air from the cylinder housing, and including an outlet port provided on the outlet tube and having a bore formed in the outlet port and communicating with the outlet tube for receiving the pressurized air from the outlet tube and the cylinder housing, and a tire repairing container including a compartment formed therein for receiving a sealing preparation, and including a coupler attached to an upper portion of the tire repairing container for engaging with the outlet port and for detachably attaching and securing and coupling to the outlet port of the outlet tube and for allowing the pressurized air to be supplied to the upper portion of the tire repairing container, and the tire repairing container including a lower opening coupled to a nozzle for coupling to an inflatable object.

The tire repairing container includes a mouth extended into the coupler for engaging into the bore of the outlet port of the outlet tube. The coupler includes a base plate, and two arms extended from the base plate and spaced from each other for forming a space between the arms and for forming a C-shaped retaining space in the coupler.

The cylinder housing includes an anchor plate extended from the outlet port, and the coupler includes an inwardly folded flange extended from each arm for partially closing the space and for engaging with the anchor plate.

The anchor plate includes a width greater than a height of the anchor plate for forming a rectangular structure, and includes two rounded corners oppositely formed thereon for allowing the coupler to be rotated relative to the anchor plate.

The outlet port is formed on a free end portion of the outlet tube and aligned with the outlet tube. The outlet port is laterally extended from the outlet tube. The tire repairing container includes an outlet piece attached and secured to the lower opening of the tire repairing container and coupled to the nozzle.

The cylinder housing includes a valve seat disposed and located between the cylinder housing and the outlet tube, and a check valve device disposed in the outlet tube and engaged with the valve seat for controlling the pressurized air to selectively flow into the outlet tube only and for preventing the pressurized air from flowing back form the outlet tube into the cylinder housing or from leaking.

A receptacle may further be provided and may include a chamber formed therein for receiving the outlet tube and the cylinder housing and the motor.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
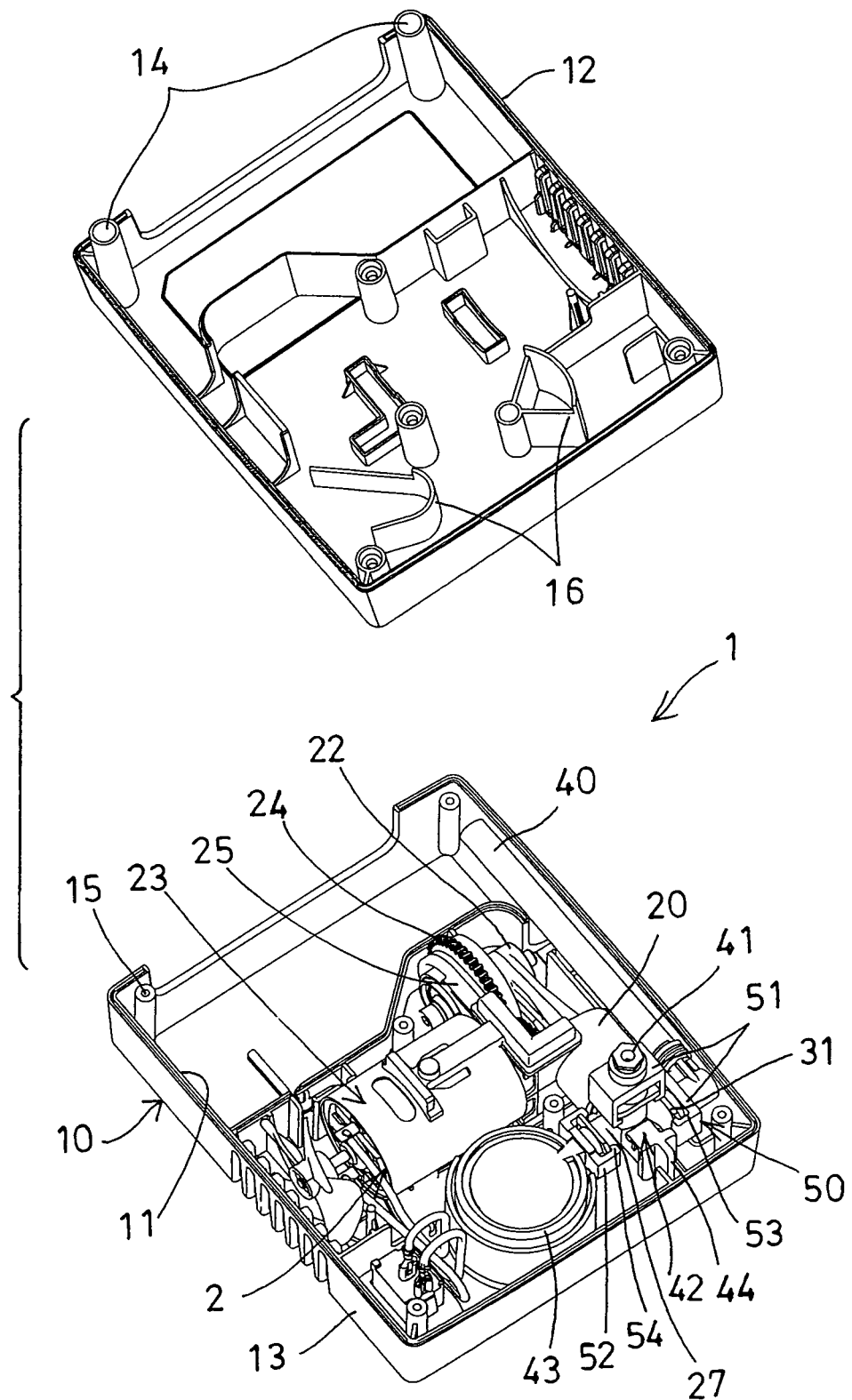
FIG. 1 is a partial exploded view of a sealing and inflating assembly in accordance with the present invention.

Referring to the drawings, and initially to FIGS. 1-4, a sealing and inflating assembly 1 in accordance with the present invention comprises an outer receptacle 10 including a chamber 11 formed therein and formed or defined by a lower receptacle member 12 and an upper receptacle member 13, in which the receptacle members 12, 13 each include one or more studs 14, 15 formed or provided therein and aligned with or engageable with each other for engaging with the latches or locks or fasteners (not shown), and for detachably securing the receptacle members 12, 13 together and for closing the chamber 11 of the receptacle 10 and for stably retaining the parts or elements or attachments or facilities in the chamber 11 of the receptacle 10.

An air compressing device 2 includes a cylinder housing 20 received and attached and secured in the chamber 11 of the receptacle 10, a piston 21 (FIG. 4) slidably engaged in the cylinder housing 20, a piston rod 22 attached or secured to or extended from the piston 22, and a motor 23 attached and secured to the cylinder housing 20 and coupled to the piston rod 22 with an eccentric or gear coupling device 24 for moving the piston 22 relative to the cylinder housing 20 in a reciprocating action, in order to generate a pressurized air of a relatively greater air pressure and a decreased flowing quantity. Several examples of the typical air compressing devices or sealing and inflating devices are disclosed in U.S. Pat. No. 6,176,285 to Gerresheim et al., U.S. Pat. No. 6,454,892 to Gerresheim et al. and U.S. Pat. No. 6,889,723 to Gerresheim et al., U.S. Pat. No. 7,021,348 to Eriksen et al., and U.S. Pat. No. 7,178,564 to Kojima et al. which may be taken as the references for the present invention.

For example, the cylinder housing 20 includes a carrier plate 25 disposed and secured or attached or extended from cylinder housing 20 and arranged substantially parallel to the piston rod 22 for attaching or mounting the motor 23 and for coupling or securing the motor 23 to the cylinder housing 20. The cylinder housing 20 includes an outlet tube 26 extended outwardly therefrom and communicating with the cylinder housing 20 for receiving the pressurized air from the cylinder housing 20, and includes one or more (such as four) outlet ports 27 formed or provided or extended from the outlet tube 26 for coupling to various parts or elements or facilities 40-43 which will be discussed hereinafter.

Figure 2:
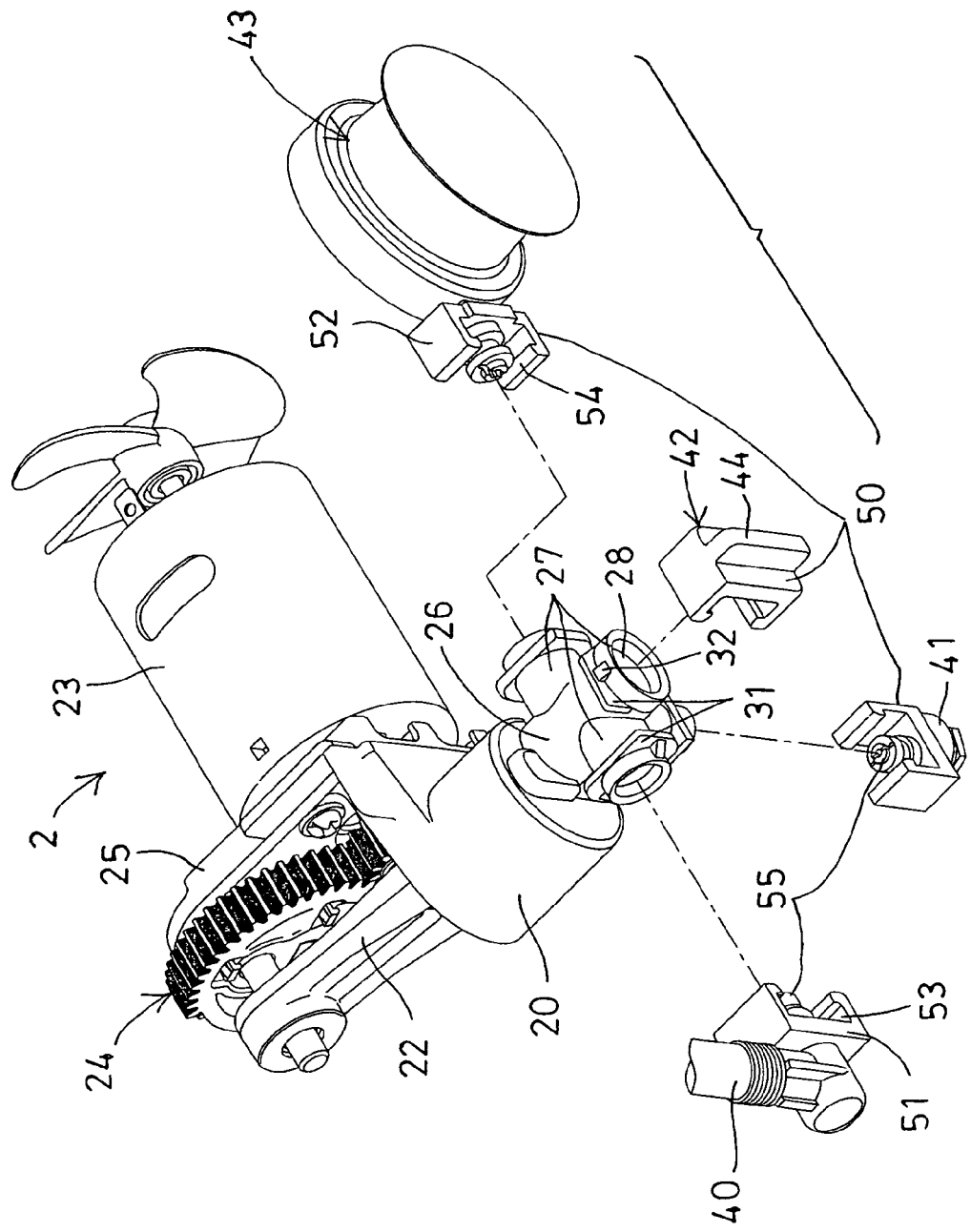
FIG. 2 is another partial exploded view of the sealing and inflating assembly.
Figure 3:
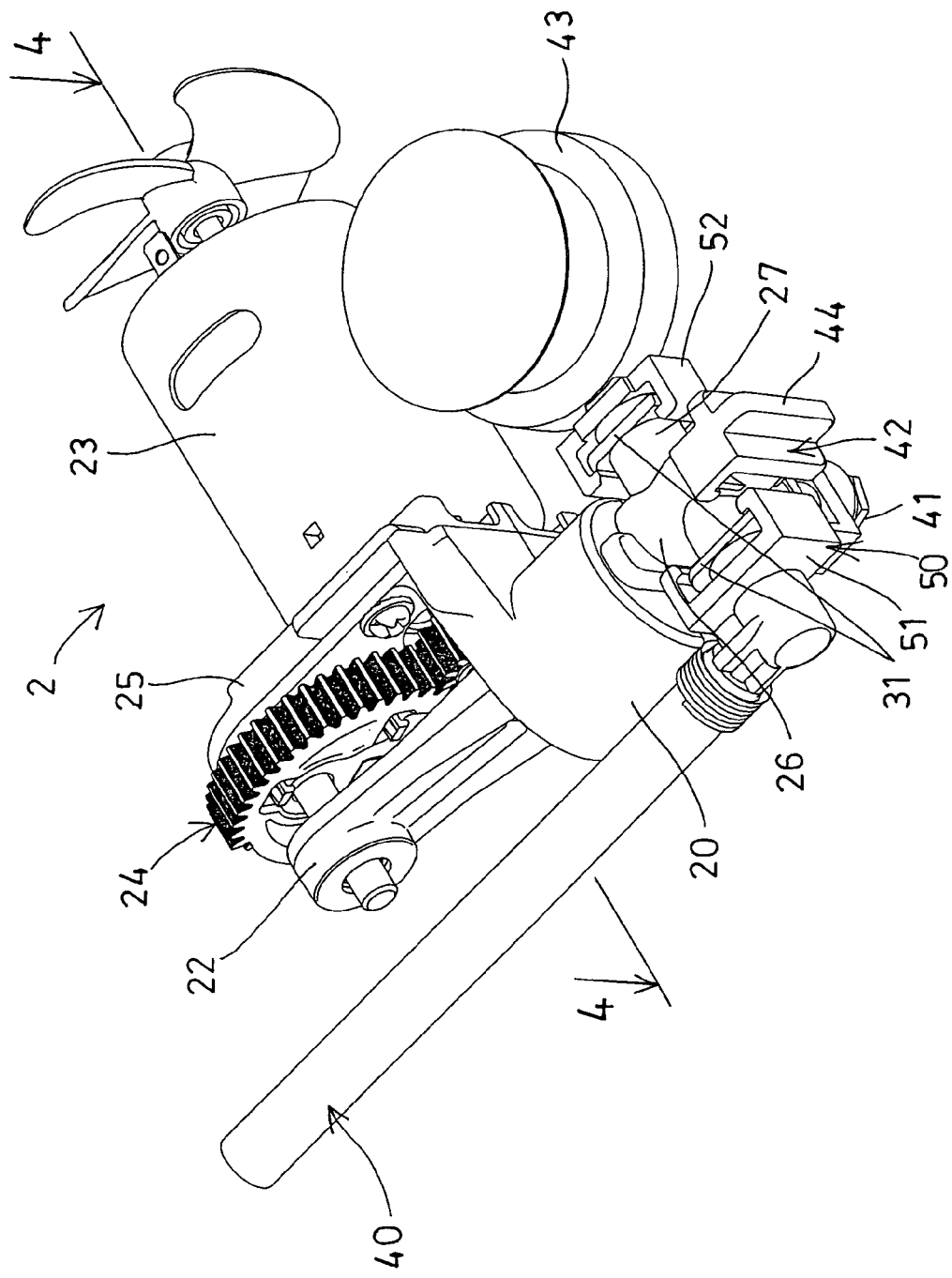
FIG. 3 is a partial bottom perspective view of the sealing and inflating assembly, in which a portion of the sealing and inflating assembly has been removed for illustrating the inner structure of the air compressor.
Figure 4:
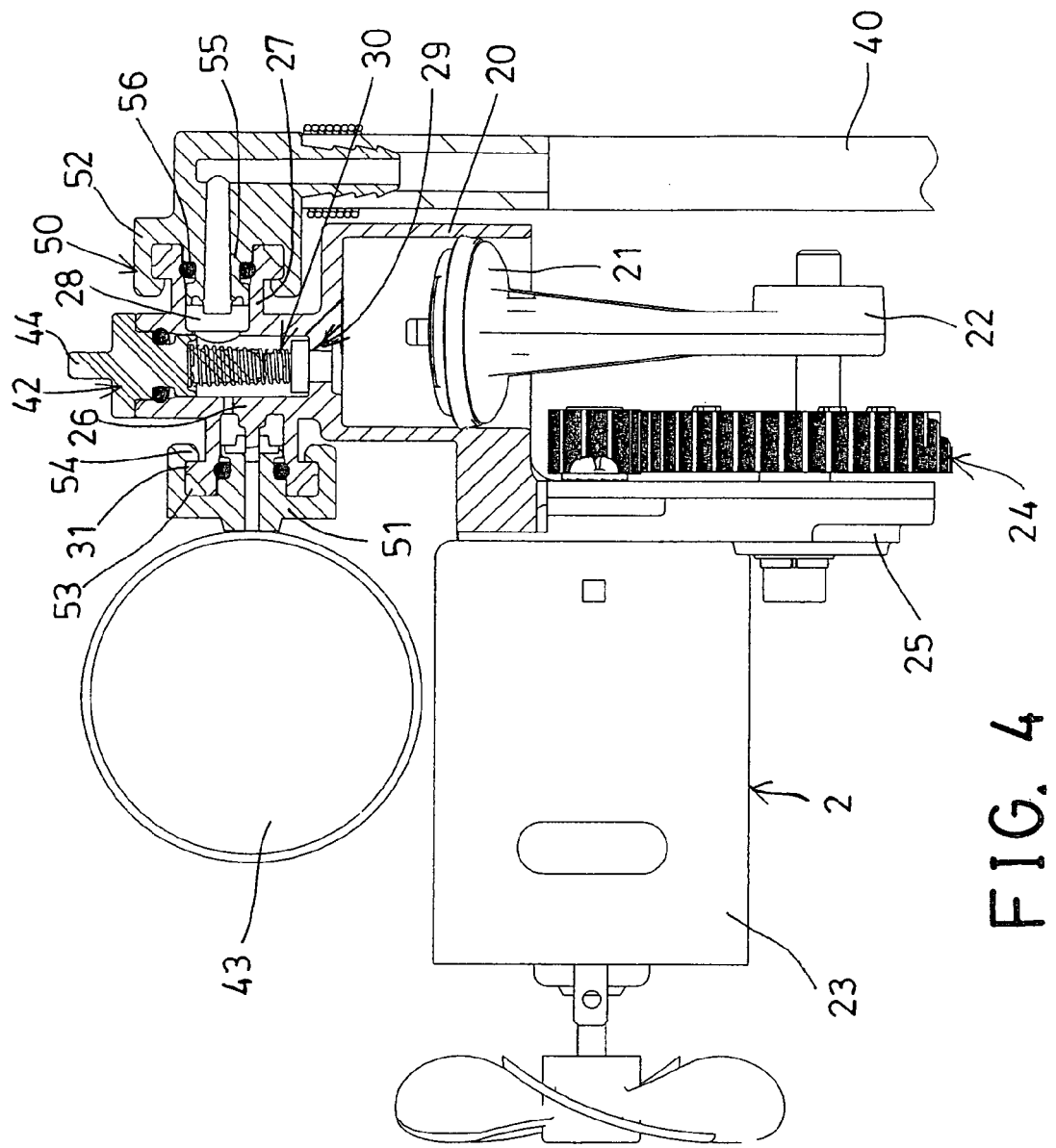
FIG. 4 is a partial cross sectional view of the sealing and inflating assembly, taken along lines 4-4 of FIG. 3.

As shown in FIGS. 2 and 4, one of the outlet ports 27 is formed on the free end portion of the outlet tube 26 and aligned with the outlet tube 26, two other outlet ports 27 are oppositely or laterally extended from the side portions of the outlet tube 26, and another outlet port 27 is extended downwardly or laterally from the outlet tube 26 (FIGS. 1-3, and 5) and perpendicular to the outlet tube 26. The outlet ports 27 each include a bore 28 formed therein and communicating with the outlet tube 26 and the cylinder housing 20 for receiving the pressurized air from the outlet tube 26 and the cylinder housing 20, and for allowing the pressurized air to selectively flow out through either of the outlet ports 27 and then to flow into the parts or elements or facilities 40-43.

The cylinder housing 20 includes a valve seat 29 formed or provided in the upper portion of the cylinder housing 20 (FIG. 4) and disposed and located between the cylinder housing 20 and the outlet tube 26 for controlling the pressurized air to selectively flow into the outlet tube 26. As also shown in FIG. 4, a spring-biased check valve device 30 is disposed in the outlet tube 26 and engaged with the valve seat 29 for controlling the pressurized air to selectively flow into the outlet tube 26 unidirectionally, and for preventing the pressurized air from flowing back form the outlet tube 26 into the cylinder housing 20. The outlet tube 26 includes an anchor plate 31 attached or secured or extended from each of the outlet ports 27, and one or more projections or weldings or ribs 32 are formed and coupled or secured between the outlet ports 27 and the anchor plates 31 (FIGS. 2, 6) for reinforcing the outlet ports 27 and/or the anchor plates 31.

Figure 6:
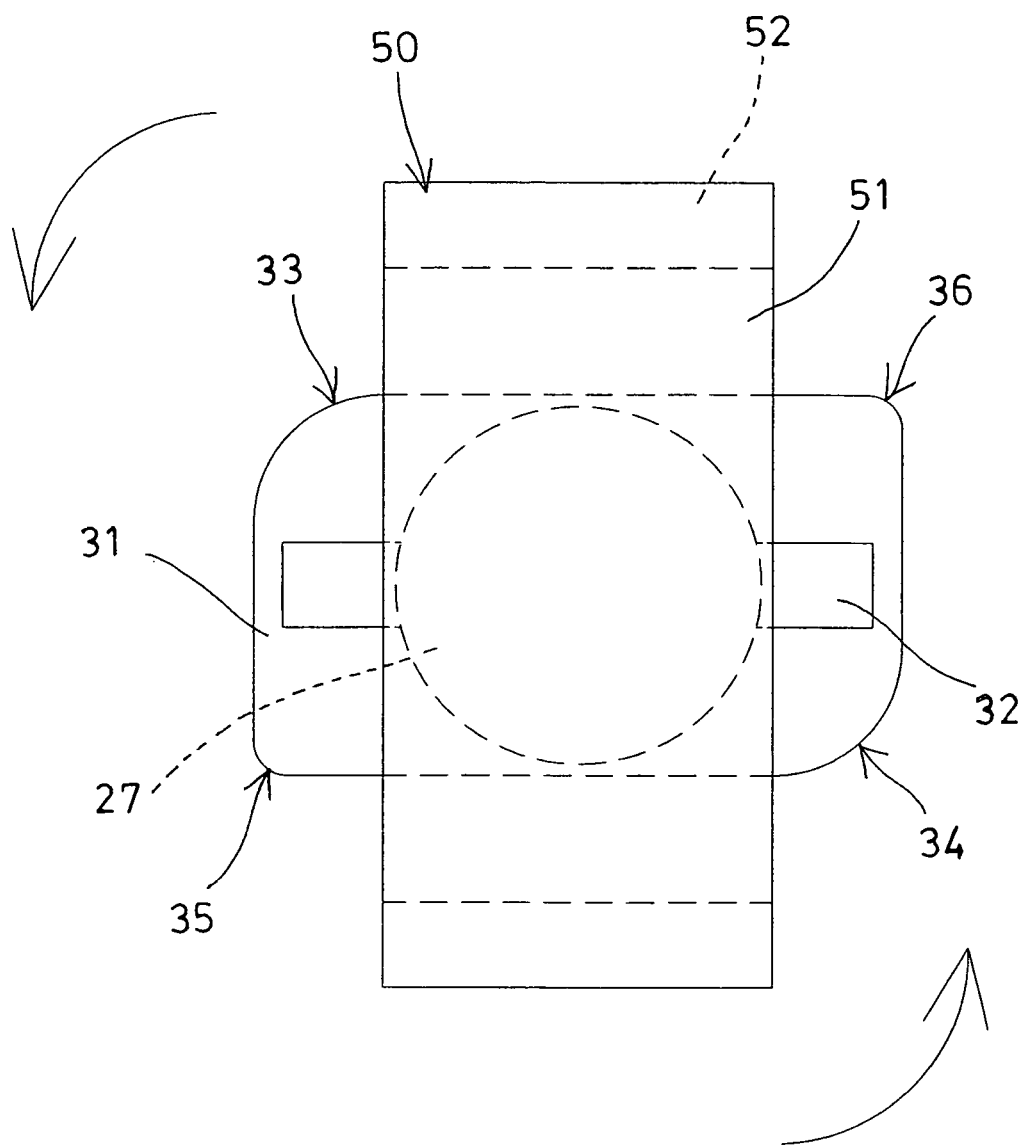
FIG. 6 is a plan schematic view illustrating a quick coupling device of the sealing and inflating assembly.
Figure 7:
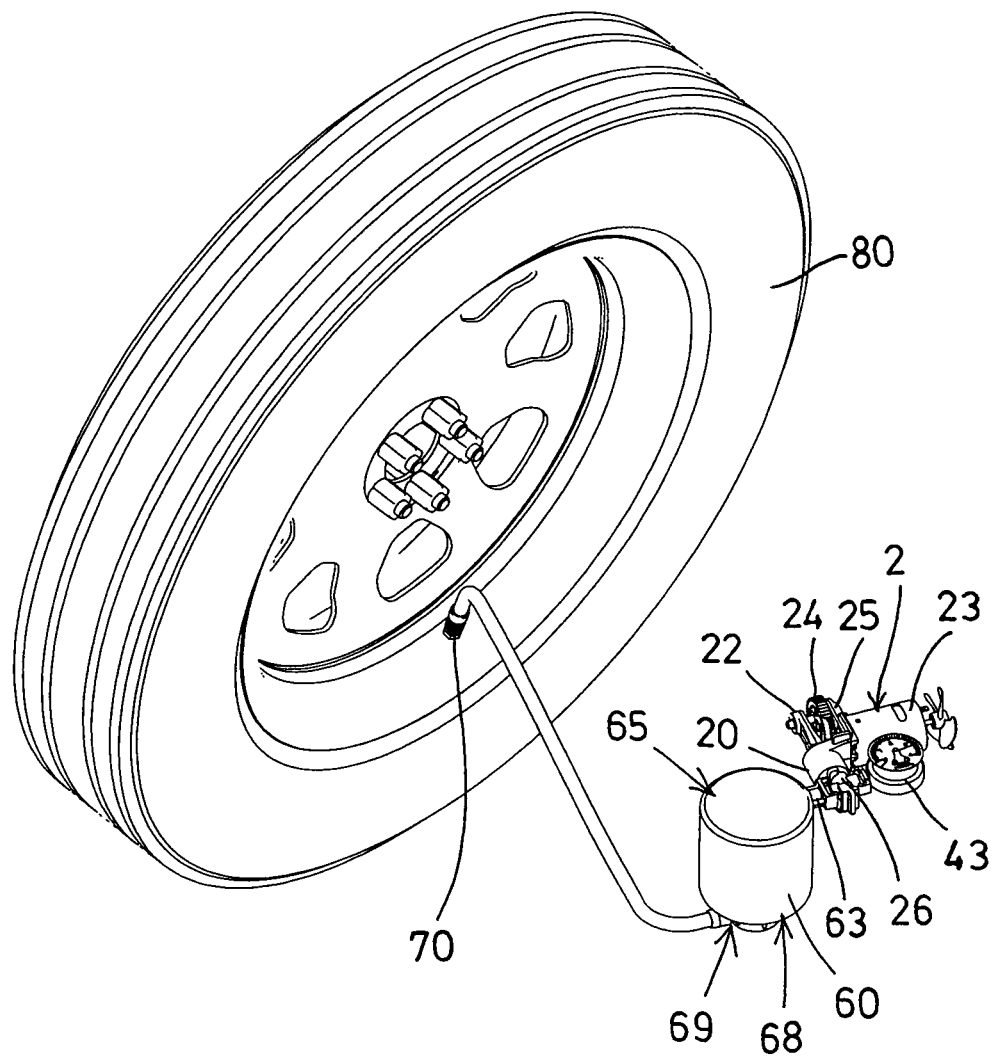
FIG. 7 is a perspective view illustrating the operation of the sealing and inflating assembly.
Figure 8:
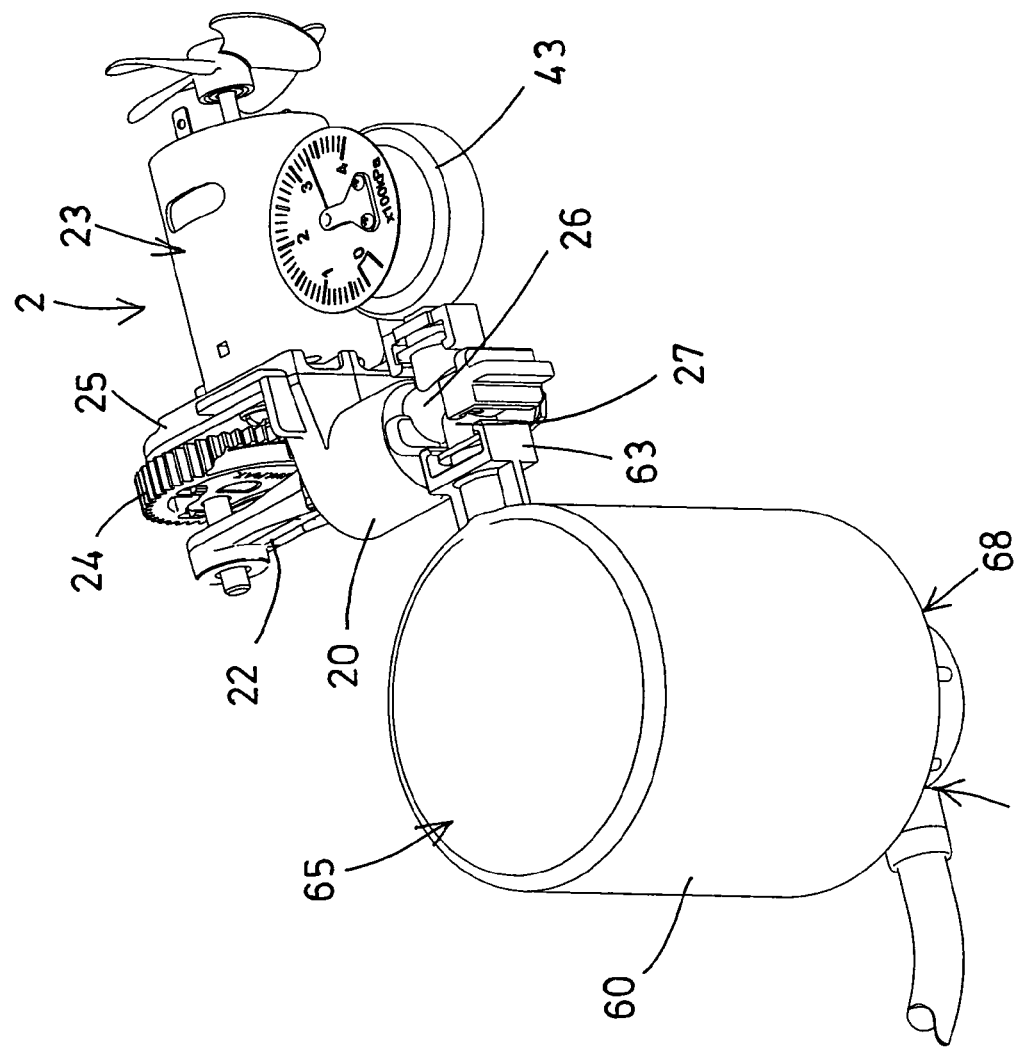
FIG. 8 is a partial perspective view illustrating the operation of the sealing and inflating assembly.
Figure 9:
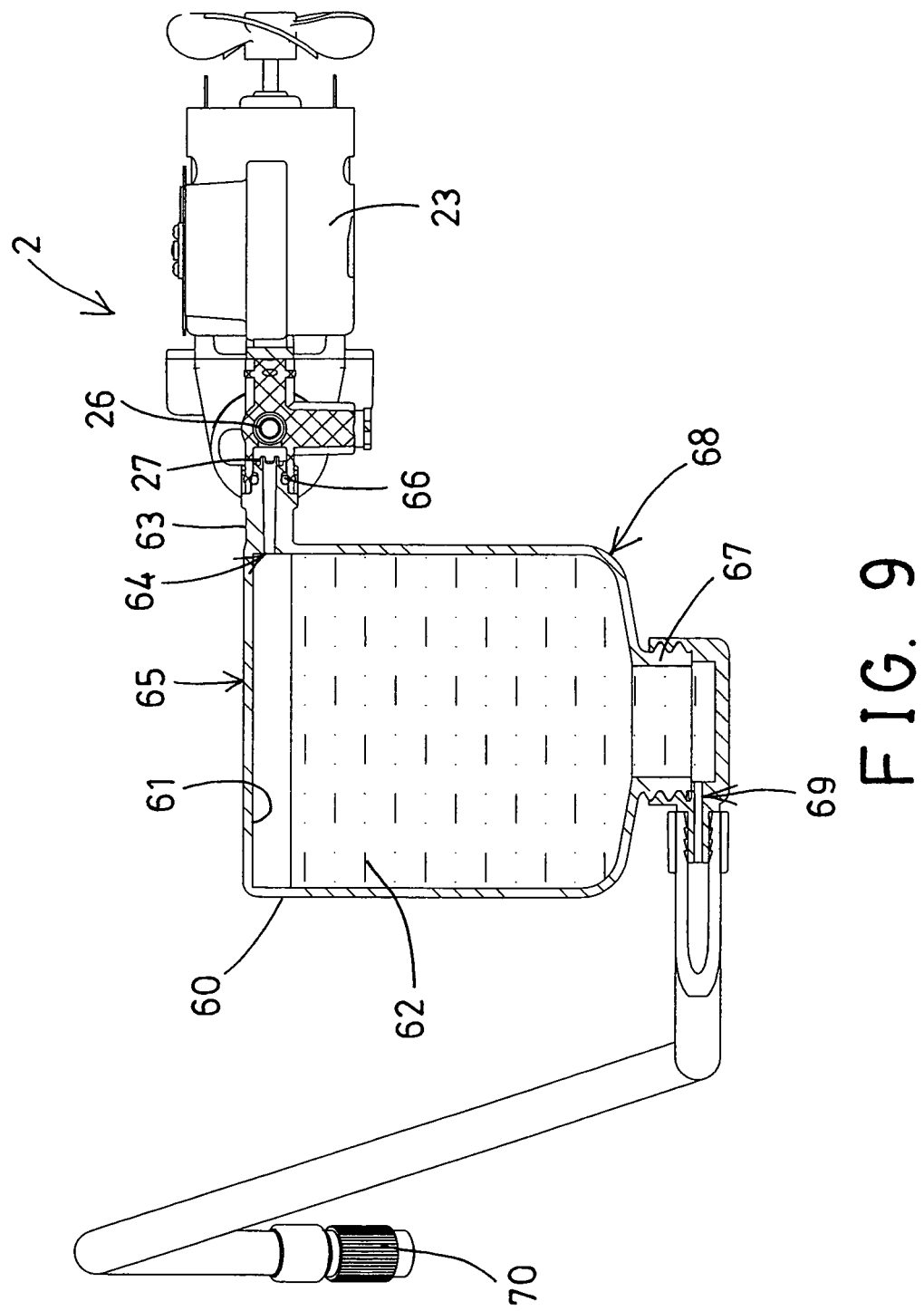
FIG. 9 is a plan schematic view of the sealing and inflating assembly, in which a portion of the sealing and inflating assembly has been cut off for illustrating the inner structure of the sealing and inflating assembly.
Figure 10:
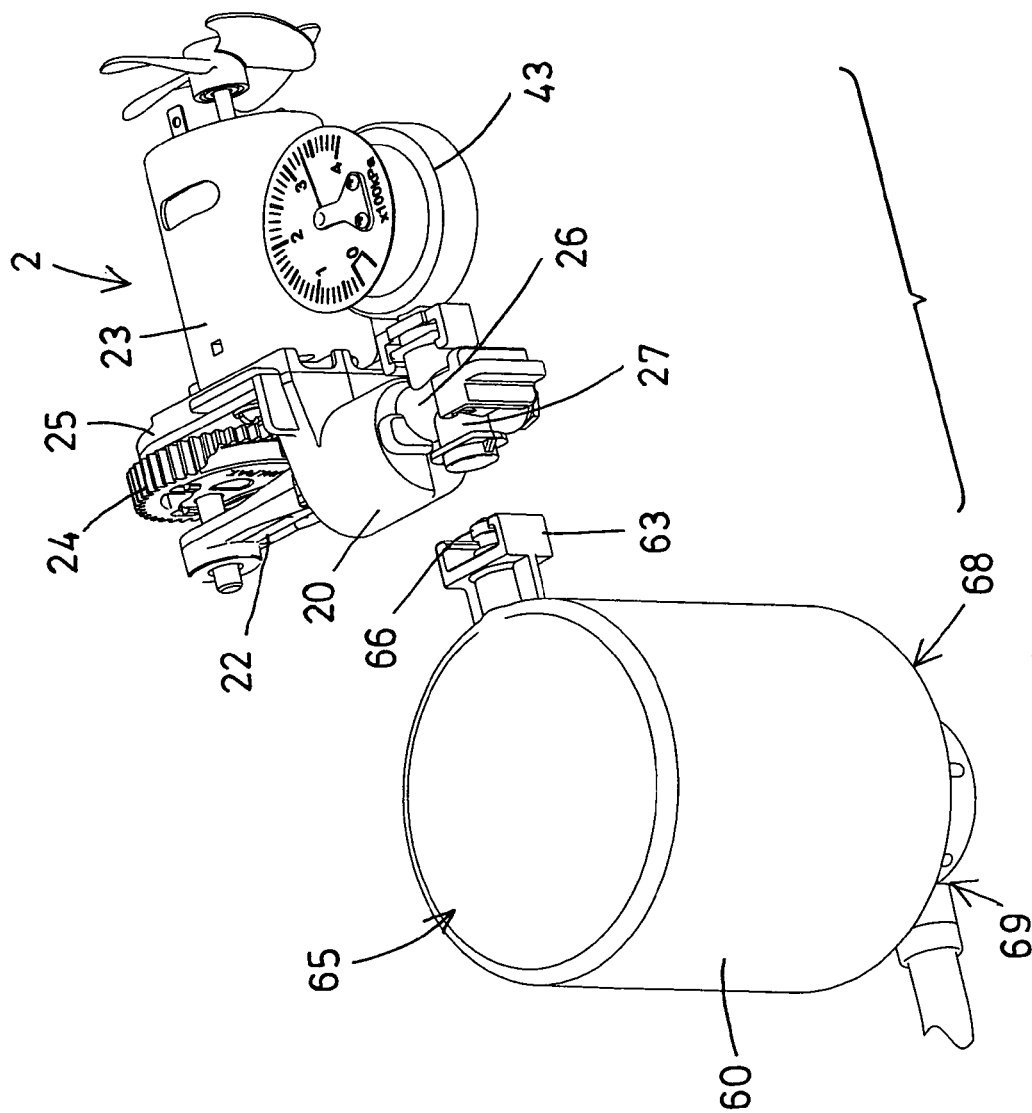
FIG. 10 is a further partial exploded view illustrating the operation of the sealing and inflating assembly.

As best shown in FIGS. 2 and 6, the anchor plates 31 each include a first dimension, such as a height or length or width greater than a second or another dimension, such as a width or length or height for forming a substantially parallelogrammic or rectangular structure, and each include two rounded corners 33, 34 oppositely formed or provided thereon, and each include two substantially straight or right-angled corners 35, 36 oppositely formed or provided thereon. The parts or elements or facilities 40-43 may be selected from a hose 40, a safety or relief valve 41, a cover 42, a pressure gauge 43 or the like, and each include a substantially C-shaped attachment or coupler 50 for quickly and detachably attaching or securing the facilities 40-43 to the outlet ports 27 of the outlet tube 26. The hose 40 may be coupled to a nozzle (not shown) for coupling to various air facilities or inflatable objects, such as tires, air beds, air cushions, hovercrafts, etc.

The coupler 50 each include a base plate 51, and two limbs or arms 52 extended from the base plate 51 and extended away from the facilities 40-43 and spaced from each other for forming a space 53 between the arms 52, and an inwardly folded hook or flange 54 extended from each arm 52 for partially closing the space 53 and for forming a C-shaped locking or retaining space 53. As shown in FIG. 6, the distance between the arms 52 or the length of the space 53 of the coupler 50 is greater than the shorter dimension or the height of the anchor plate 31 for allowing the anchor plate 31 to be engaged into the space 53 of the coupler 50 and for allowing the base plate 51 to be engaged with the outlet ports 27 of the outlet tube 26 relatively.

The facilities 40-43 each include a mouth 55 extended therefrom and extended into the space 53 of the coupler 50 and disposed and located between the arms 52 and the flanges 54 for engaging into the bores 28 of the outlet ports 27 respectively when the base plate 51 is engaged with the outlet port 27 of the outlet tube 26 and/or when the anchor plate 31 is engaged into the space 53 of the coupler 50. The coupler 50 may then be rotated over the rounded corners 33, 34 of the anchor plate 31 and rotated counterclockwise (FIG. 6) and rotated relative to the outlet port 27 for about ninety (90) degrees, to have the arms 52 and/or the flanges 54 to engage with the side portions of the anchor plate 31 and to detachably attach and secure and lock the couplers 50 and the facilities 40-43 to the outlet ports 27 of the outlet tube 26.

As also shown in FIG. 4, a sealing ring 56 may be attached or engaged onto the mouth 55 of each coupler 50 or of each facility 40-43 for engaging with the outlet port 27 of the outlet tube 26 and for making an air tight seal between the outlet port 27 and the mouth 55 of the coupler 50 and for allowing the pressurized air to be effectively flown into the facilities 40-43 without leaking out of the outlet port 27 of the outlet tube 26. The cover 42 includes a hand grip or knob 44 extended therefrom for allowing the cover 42 to be easily rotated relative to the outlet port 27 with the knob 44. It is preferable that the receptacle 10 includes one or more protrusions 16 extended therefrom, such as extended inwardly into the lower receptacle member 12 (FIG. 1) for engaging with the facilities 40-43 and for stably retaining the facilities 40-43 in the chamber 11 of the receptacle 10.

Figure 5:
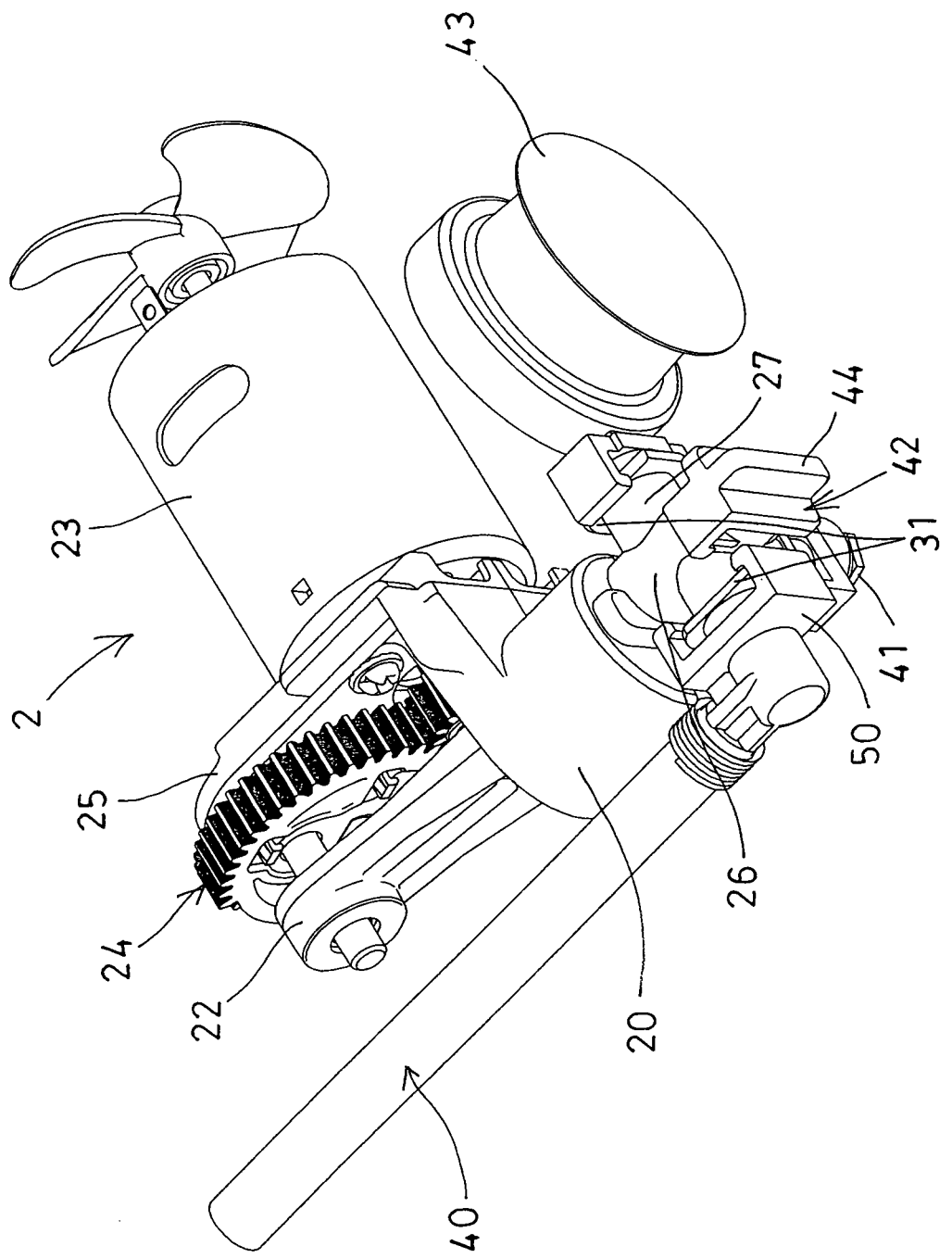
FIG. 5 is a partial bottom perspective view similar to FIG. 3, illustrating the operation of the sealing and inflating assembly.

In operation, as shown in FIG. 5, the mouth 55 of the coupler 50 and of the pressure gauge 43 may first be engaged into the bore 28 of either of the outlet ports 27, and the base plate 51 may be forced to engage with the outlet port 27 of the outlet tube 26 and/or the anchor plate 31 may be engaged into the space 53 of the coupler 5. The coupler 50 and the pressure gauge 43 may then be rotated relative to the outlet port 27 for about ninety (90) degrees, to have the arms 52 and/or the flanges 54 to engage with the side portions of the anchor plate 31 and to detachably attach and secure and lock the couplers 50 and the facility or pressure gauge 43 to the outlet port 27 of the outlet tube 26.

It is to be noted that the facilities 40-43 may be easily and quickly and changeably attached and secured to either of the outlet ports 27 of the outlet tube 26 for allowing the facilities 40-43 to be attached to the suitable outlet ports 27 at the suitable locations or positions when required. When it is required to change the place of the facilities 40-43 or when it is required to disengage the facilities 40-43 from the outlet ports 27 of the outlet tube 26, the facilities 40-43 may be rotated clockwise relative to the outlet port 27 and to allow the couplers 50 and the facilities 40-43 to be easily and quickly disengaged from the outlet ports 27 of the outlet tube 26.

As shown in FIGS. 7-10, the sealing and inflating assembly 1 in accordance with the present invention further includes a tire repairing container 60 having a compartment 61 formed therein for receiving a sealing preparation 62 and for selectively supplying the sealing preparation 62 to seal and inflate the inflatable objects, such as vehicle tires, air beds, air cushions, hovercrafts, etc., and includes a C-shaped attachment or coupler 63 attached and secured to an entrance 64 that is formed or provided on the upper portion 65 of the tire repairing container 60 and having a mouth 66 (FIGS. 9, 10) for quickly and detachably attaching or securing the tire repairing container 60 to the outlet ports 27 of the outlet tube 26 and thus for easily and quickly attaching or coupling to the cylinder housing 20 of the air compressing device 2.

Figure 11:
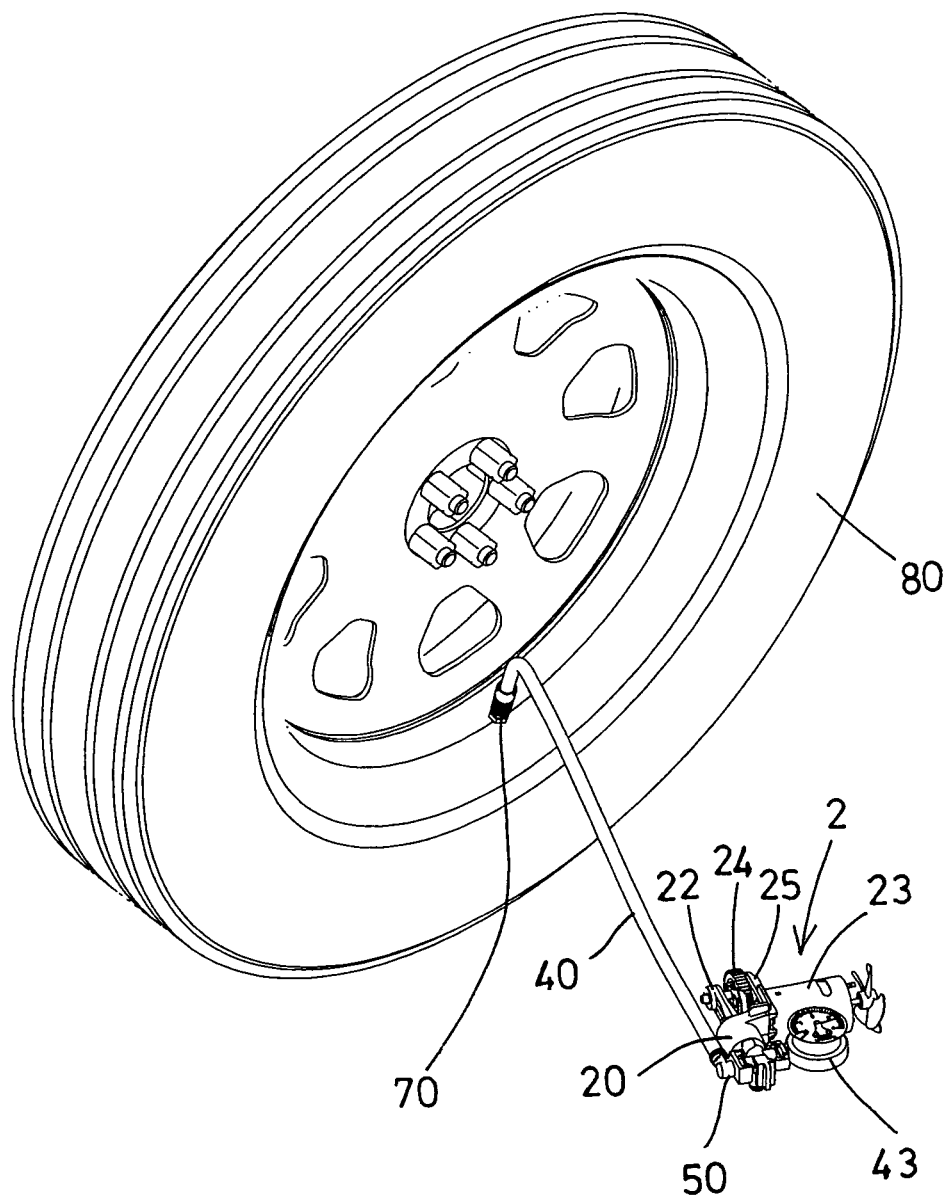
FIG. 11 is a perspective view similar to FIG. 7, illustrating the operation of the sealing and inflating assembly.

The tire repairing container 60 further includes an opening 67 formed or provided on the lower portion 68 of the tire repairing container 60, and an outlet mouth or piece 69 attached and secured to the lower opening 67 of the tire repairing container 60 and coupled to a nozzle 70 for coupling to various air facilities or inflatable objects 80, such as tires 80, air beds, air cushions, hovercrafts, etc., and for selectively supplying the sealing preparation 62 (FIGS. 7, 9) to seal the inflatable objects or vehicle tires 80, or for selectively supplying the pressurized air to inflate the inflatable objects or vehicle tires 80 with the hose 40, the coupler 50 and the nozzle 70 (FIG. 11) when the tire repairing container 60 is selectively removed or disengaged from the outlet tube 26 of the cylinder housing 20 of the air compressing device 2.

It is to be noted that the entrance 64 is formed or provided on the upper portion 65 of the tire repairing container 60 and the pressurized air may be directly supplied into the upper portion 65 of the tire repairing container 60 without flowing through the sealing preparation 62, or without being interfered or influenced by the sealing preparation 62 such that the outlet ports 27 of the outlet tube 26 of the cylinder housing 20 may be easily and quickly and directly attached and coupled to the upper entrance 64 of the tire repairing container 60 with the coupler 63. In addition, the opening 67 is formed or provided on the lower portion 68 of the tire repairing container 60 and may be easily and quickly and directly coupled to the nozzle 70 with the outlet mouth or piece 69 for coupling to various air facilities or inflatable objects 80 without additional coupling devices.

Accordingly, the sealing and inflating assembly includes a quick coupling device for quickly coupling and attaching and securing various parts or elements or attachments or facilities to an outlet tube of the air compressor and also for quickly disengaging the parts or elements or attachments or facilities or tire repairing containers from the air compressor and thus for allowing the parts or elements or attachments or facilities or tire repairing containers to be quickly and changeably attached and secured to the outlet tube of the air compressor.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A sealing and inflating assembly comprising:
    a cylinder housing,
    a piston slidably engaged in said cylinder housing,
    a piston rod extended from said piston,
    a motor attached to said cylinder housing and coupled to said piston rod for moving said piston relative to said cylinder housing in a reciprocating action, in order to generate a pressurized air,
    said cylinder housing including an outlet tube extended outwardly therefrom and communicating with said cylinder housing for receiving the pressurized air from said cylinder housing, and including an outlet port provided on said outlet tube and having a bore formed in said outlet port and communicating with said outlet tube for receiving the pressurized air from said outlet tube and said cylinder housing, and
    a tire repairing container including a compartment formed therein for receiving a sealing preparation, and including a coupler attached to an upper portion of said tire repairing container for engaging with said outlet port and for detachably attaching and securing and coupling to said outlet port of said outlet tube and for allowing the pressurized air to be supplied to said upper portion of said tire repairing container, and said tire repairing container including a lower opening coupled to a nozzle for coupling to an inflatable object, and said coupler including a base plate, and two arms extended from said base plate and spaced from each other for forming a space between said arms and for forming a C-shaped retaining space in said coupler.

2. The sealing and inflating assembly as claimed in claim 1, wherein said tire repairing container includes a mouth extended into said coupler for engaging into said bore of said outlet port of said outlet tube.

3. The sealing and inflating assembly as claimed in claim 1, wherein said cylinder housing includes an anchor plate extended from said outlet port, and said coupler includes an inwardly folded flange extended from each arm for partially closing said space and for engaging with said anchor plate.

4. The sealing and inflating assembly as claimed in claim 3, wherein said anchor plate includes a width greater than a height of said anchor plate for forming a rectangular structure, and includes two rounded corners oppositely formed thereon for allowing said coupler to be rotated relative to said anchor plate.

5. The sealing and inflating assembly as claimed in claim 1, wherein said outlet port is formed on a free end portion of said outlet tube and aligned with said outlet tube.

6. The sealing and inflating assembly as claimed in claim 1, wherein said outlet port is laterally extended from said outlet tube.

7. The sealing and inflating assembly as claimed in claim 1, wherein said tire repairing container includes an outlet piece attached and secured to said lower opening of said tire repairing container and coupled to said nozzle.

8. The sealing and inflating assembly as claimed in claim 1, wherein said cylinder housing includes a valve seat disposed and located between the cylinder housing and the outlet tube, and a check valve device disposed in said outlet tube and engaged with said valve seat for controlling the pressurized air to selectively flow into said outlet tube only and for preventing the pressurized air from flowing back form said outlet tube into said cylinder housing.

9. The sealing and inflating assembly as claimed in claim 1, wherein a receptacle is further provided and includes a chamber formed therein for receiving said outlet tube and said cylinder housing and said motor.

\* \* \* \* \*